United States Patent [19]

Uba

[11] 4,414,295
[45] Nov. 8, 1983

[54] BATTERY SEPARATOR

[75] Inventor: Toshio Uba, Denver, Colo.

[73] Assignee: Gates Energy Products, Inc., Denver, Colo.

[21] Appl. No.: 375,503

[22] Filed: May 6, 1982

[51] Int. Cl.³ .................. H01M 10/52; H01M 2/18
[52] U.S. Cl. .................................... 429/59; 429/145
[58] Field of Search .................. 429/144, 145, 59, 57

[56] References Cited

U.S. PATENT DOCUMENTS

| 2,117,371 | 5/1938 | Slayter | 429/145 |
| 3,862,861 | 1/1975 | McClelland et al. | 429/57 |
| 4,137,377 | 1/1979 | McClelland | 429/145 |

FOREIGN PATENT DOCUMENTS

| 925091 | 5/1963 | United Kingdom | 429/145 |

*Primary Examiner*—Donald L. Walton
*Attorney, Agent, or Firm*—C. H. Castleman, Jr.; H. W. Oberg, Jr.; Raymond Fink

[57] ABSTRACT

A multi-layered gas permeable separator for lead-acid maintenance-free batteries, particularly for sealed gas recombining type rechargeable lead-acid batteries, is disclosed. The outer separator layers, adapted to be positioned against the opposite polarity plates of the battery, are composed of ultrafine fibers particularly glass fibers of relatively high fiber surface area. A third layer is interposed between the outer layers and is comprised of ultrafine fibers particularly of fiber glass, but has a fiber surface area on an equivalent weight basis which is substantially less than that of at least one of the outer layers. High rate, low temperature discharge performance of the battery is enhanced.

16 Claims, 2 Drawing Figures

LEGEND:
X = ALL 60% SURFACE AREA
O = ALL 78% SURFACE AREA
△ = { 60% SURFACE AREA INNER LAYERS / 100% SURFACE AREA OUTER LAYERS
▽ = { 78% SURFACE AREA INNER LAYERS / 100% SURFACE AREA OUTER LAYERS
□ = ALL 100% SURFACE AREA (CONTROL)

BATTERY SEPARATOR

BACKGROUND OF THE INVENTION

This invention relates to battery separators for retained-electrolyte maintenance-free lead-acid rechargeable batteries, which have a high affinity for the electrolyte whereby it is tightly held in the separator matrix during use of the battery.

McClelland et al. U.S. Pat. No. 3,862,861 teaches a new class of sealed lead-acid batteries. Unique performance characteristics are obtained by employing an ultrafine fiber diameter absorptive mat of large surface area per unit of volume and a large porosity, enabling retention of the bulk of the acid electrolyte (capacity determining) of the cell in the separator phase while leaving a sufficiently thin layer of electrolyte on the plate particle surfaces and pore walls to sustain internal oxygen recombination within the cell at high efficiencies, even at elevated rates of overcharge.

In commercial practice, the cells have employed one or more identical separator layers formed of a mixture of glass fibers, the bulk of which are in the 0.1–1.0 micron range, with lesser amounts in the 1.0–5 micron range and, for structural and handling requirements minor amounts of fibers in the 5–20 micron range. These ultrafine glass fiber separators serve well in this application because of the high heat of wetting of sulfuric acid on glass, their large surface area per unit of volume of separator material (approximately 0.1 to 20 square meters per gram of silica), and porosities ranging as high as from about 85–95 percent. Typical separator materials of this type are illustrated in published U.K. Patent Application No. 2,048,556A (see scanning electron photomicrographs of FIGS. 5 and 6).

Multilayered separators for maintenance-free lead-acid cells in which at least one of the layers includes a highly retentive ultrafine fiber diameter glass material of the type previously discussed, are also known. For instance, see Eisenacher et al. U.S. Pat. No. 3,753,784, Kono et al. U.S. Pat No. 4,262,068 (see particularly column 1, lines 58 through column 2, line 9), McClelland U.S. Pat. No. 4,137,377 and Japanese Application No. 79/98,386 (Chemical Abstracts 94:195041k).

It is an object of this invention to define a multilayered separator for sealed lead-acid batteries which enhances the performance of the battery particularly at high rates of discharge and/or discharge at low temperature.

SUMMARY OF THE INVENTION

Briefly described, in one aspect the invention resides in a highly electrolyte-absorptive gas permeable sandwich separator for a maintenance-free lead-acid electrochemical cell (which term includes "batteries") including: (i) a first outer porous layer formed of ultrafine fibers readily wetted by sulfuric acid electrolyte, having a fiber surface area in the range from about 0.1 to about 20 square meters per gram of such fiber material, and adapted to be positioned against a given polarity electrode plate of the cell; (ii) a second such outer porous layer formed of ultrafine fibers, adapted to be positioned against the opposite polarity electrode plate of the cell; and (iii) a third porous layer interposed between the first and second layers, comprised of ultrafine fibers readily wetted by sulfuric acid electrolyte, having a fiber surface area on an equivalent weight basis substantially less than that of at least one of said first and second layers.

In another aspect the invention is drawn to a maintenance-free sealed lead-acid cell incorporating the aforementioned separator, and having electrolyte distributed within the cell in a prescribed manner.

BRIEF DESCRIPTION OF THE DRAWINGS

The invention will be described in part by reference to the accompanying drawings, in which like numerals designate like parts, and in which.

PREFERRED EMBODIMENTS OF THE INVENTION

Figure 1:
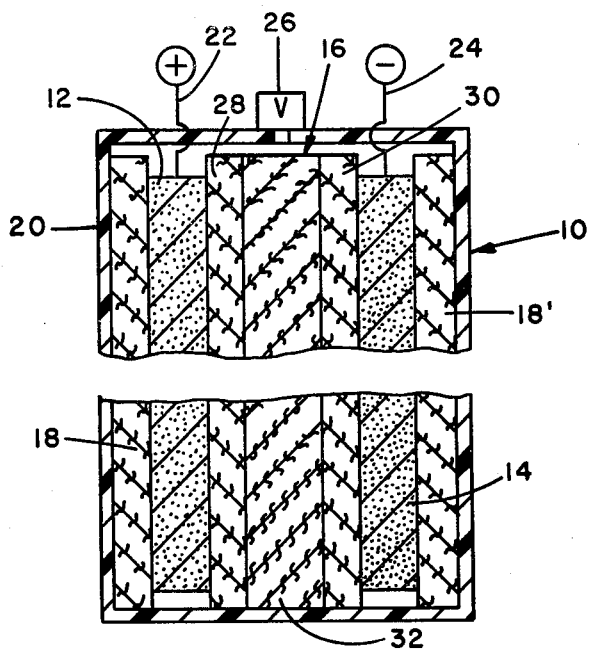
FIG. 1 is a schematic elevational sectional view of an electrochemical cell configured in accordance with the invention, the separator thickness shown exaggerated for illustration purposes.

Referring to FIG. 1, there is shown generally at 10 a maintenance-free lead-acid cell including at least one positive plate 12, at least one negative plate 14, interposed multilayered separator 16 extending beyond the plate edges, and optional outer spacers 18, 18'. The cell pack of plates and separator exists under firm mutual stacking pressure. In addition to the vertical parallel stacked (prismatic) configuration shown, the cell may be formed into any other desired configuration, such as spirally wound into a jelly-roll configuration or horizontally stacked in a button cell. The cells may also be formed into desired multicell battery configurations.

The cell pack elements are confined within preferably a normally sealed enclosure or container 20 formed of a suitable insulating material. The positive 22 and negative 24 output terminals are connected to the respective electrode plates through electrolyte-tight passageways in the container wall, in known manner. The cell is preferably equipped with a resealable safety valve shown schematically at 26, for release of excessive gas pressure (at super-atmospheric pressure) whether abnormally generated or if developed during the normal operation and overcharging of the cell. The cell is orientation-independent and may be discharged or charged in any attitude without electrolyte or significant water loss.

The electrode plates 12, 14, which form no specific part of the invention, may be the conventional lead grid substrate laden with electrochemically active positive and negative lead pastes, e.g., principally lead dioxide for the positive, and lead in the negative, upon formation. High purity lead grids of high hydrogen overvoltage are preferred where sealed operation is sought.

In accordance with the invention separator 16 is formed of a multilayered member which is designed to retain the bulk of the electrolyte employed in the cell, having a porosity in an uncompressed state of from about 60 to about 95 percent, more preferably from about 70 to about 92 percent. The multilayered separator retains a relatively large volume of electrolyte within its matrix in the cell, yet retains sufficient voids and low tortuosity gas paths to permit gas, particularly oxygen evolved at the positive plate to overcharge, to pass through a thin electrolyte layer at the positive electrode plate particle surface, through the low tortuosity gas channels provided in the separator, and finally through a thin layer of electrolyte present on the negative plate particles and pore surfaces there to be consumed (recombined).

Separator 16 includes at least one readily compressible layer 28 of ultrafine diameter fibrous material, particularly fiber glass randomly oriented in a mat form, adapted to contact the positive plate, and a similar type layer 30 adapted to contact the negative plate. By "ultrafine" in this application is meant that the average fiber diameter, on a weight basis, is less than about 3 microns. Each of layers 28, 30 may themselves be composed of multiple adjoining layers having the characteristics set forth herein. The layers should be sufficiently compressible to intimately conform to the surface of the adjoining plates and, upon compression, the thickness of such layers may typically be reduced to from about 70 to about 95 percent of the original thickness of the layer.

To achieve the preferred high specific surface area of the separator per unit of volume, of preferably from about 0.1 to about 20 square meters per gram of fiber material (silica), more preferably from about 1 to about 15 square meters per gram of silica, a substantial portion of the fibers in layers 28 and 30 should have diameters less than about 1 micron. In any case the major portion of the fibers on a weight basis should be less than about 3 micron average diameter i.e., ultrafine. Preferably, at least 50 and more preferably at least 65 percent by weight of fibers have average diameters less than 1 micron, more preferably less than about 0.8 microns. The remainder of the fibers may be of various grades and diameters to achieve needed tensile strength for processing and fabrication into mats or sheets. As an example, a useful mixture includes from about 65 to 95 percent by weight of 0.1 to about 0.8 micron average diameter fibers, and from about 5 to about 25 percent by weight of fibers having average diameters from about 0.8 to about 5 micron, and minor amounts, e.g., from about 3 up to about 20 percent by weight of rovings having average diameters in the range from about 5 to about 30 microns. The average lengths of the fibers is not narrowly critical and the finer fibers may be quite short and the rovings may, for instance, be on the order of 2 to about 10 mm in average length.

Given the fiber diameter size(s) and proportion of each size in layers 28 and 30, the surface area per unit of weight of the fiber material can be determined. In accordance with the invention, a third porous separator layer 32 is interposed and sandwiched between layers 28 and 30, having a porosity in an uncompressed state of from about 60 to about 95 percent, more preferably from about 70 to about 92 percent. This third layer 32 is also comprised of ultrafine fibers which are readily wetted by sulfuric acid electrolyte, and may have a composition similar to each of layers 28 and 30. However, the third, interposed layer 32 must have a fiber surface area per unit of fiber material weight (as determined) which is substantially less than that of at least one of, but preferably both of layers 28 and 30. Preferably, the interposed layer 32 will have a determined surface area as expressed in square meters per gram of fiber material (e.g., silica) of from about 30 to about 90 percent, more preferably from about 50 to about 90 percent, and most preferably from about 70 to about 85 percent of the determined surface area of either of preferably both of said layers 28 or 30, positioned adjacent the respective opposite polarity electrodes.

It is preferred that the sandwich of layers be held together solely by mutual compression in the cell to establish the proper capillary link between the separator and plates, low tortuosity gas paths, and to minimize the chance for shedding of active material. However, if desired layer 32 can be bound or adhered to layers 28, 30 such as by lamination with a binder, so long as the binder does not contaminate the system or destroy the heat of wetting of the glass separator fibers, sufficient gas paths are still available through the separator 16, and electrolyte continuity is maintained.

The porous mat 16 comprised of layers 28, 30, 32 of the invention is generally compressible so that it may follow and mutually press against the adjoining surfaces of the electrode plates. In this manner the proper capillary action is achieved, tending to cause the bulk of the electrolyte of the cell (in ample quantity for high capacity) to be absorbed in separator 16 with a substantially lesser amount of electrolyte of the cell being retained principally as a thin layer on the particles and pore surfaces of the porous plates 12 and 14, in accordance with the teaching of U.S. Pat. No. 3,862,861. That patent describes and illustrates a preferred cell in which the subject separator has utility, and such patent is hereby incorporated by reference in its entirety. In accordance with the teaching of that patent, the amount of electrolyte metered into the cell is chosen such that, within limits having some flexibility and self-adjustment, the plate pores and surfaces are underfilled, i.e., "starved" so that substantial void volume is provided to ensure that three-phase boundaries of sufficient extent are present to support internal oxygen recombination. In this manner, oxygen evolved on overcharge from the positive active material will easily diffuse in the gas phase from the positive plate, through the multilayered separator of the invention which, while containing a large proportion of its volume soaked up with electrolyte, has sufficient void areas remaining between the coated fiber surfaces to allow the gas to be directly transported through the separator in a nontortuous path, and then diffusing to the active sites at the thin layer boundary existing at the negative electrode.

While Applicant does not fully understood the mechanism by which the multilayered separator functions to improve the performance of the battery, tests have clearly shown that by using a reduced surface area layer 32 interposed between relatively higher surface area outer layers 28, 30 a sealed lead-acid battery has significantly improved high discharge capability at low temperatures. In this respect reference is made to the graph of FIG. 2 which plots the discharge time in seconds versus the cycle number of electrochemical cells having various separator compositions (but otherwise having the same configuration), all subjected to a high rate low temperature discharge regime.

The test used 2 volt D size cells of the sealed rechargeable lead-acid type disclosed in McClelland et al. U.S. Pat. No. 3,862,861, having a nominal capacity (10-hour rate) of 2.5 ampere hours. Five different groups of cells were constructed (refer to legend of FIG. 2). The primary control cells were standard production D cells (commercially available from applicant's assignee) employing a standard all fiber glass separator 16 formed of four identical adjoining layers of type 225B separator material (manufactured by C. H. Dexter Corporation). The 225B composition is essentially 83 weight percent of industry code AAA glass fibers (0.5-0.75 micron average diameter), 11 weight percent of Code A glass fibers (1.5 to 2.5 micron average diameter), and 6 weight percent of ¼ inch (6.35 mm)

chopped glass fibers of about 13 micron diameter. The overall uncompressed thickness of the four 225B ultrafine glass fiber mats was about 1.2 mm (compressed in the cell to about 1.0 mm). The production controls are designated in the legend as employing all 100% surface area separator.

The second set of test cells was identical with the controls with the exception that each of the four 225B layers was replaced by a layer of the same general composition and thickness, but formed of 50% by weight of Code AAA glass fibers and 50% by weight of ¼ inch (6.35 mm) chopped glass fibers of about 13 micron average diameter. This composition results in a separator with a calculated surface area of 60 percent (square meters per gram of silica) of the determined surface area of the 225B layers.

Similarly, the third set was the same as the all 225B controls with the exception that each of the four 225B layers was replaced by ultrafine fiber glass mat layers, of the same thickness, whose surface area was calculated to be 78 percent of the control. These layers were composed of 65% by weight of Code AAA glass fibers and 35% by weight of ¼ inch (6.35 mm) chopped glass fibers of about 13 micron average diameter.

Two additional groups of test cells were made, constructed in accordance with the invention. In the first set a standard 0.3 mm thick layer of Dexter 225B was used against each of the electrodes, and two 0.3 mm thick layers of the 60 percent surface area ultrafine glass mats (having the above-described composition) were interposed in a sandwich between the layers of 225B (compressed to about 1.0 mm). In the last group, two 0.3 mm thick layers of 225B were used adjacent the electrodes, and two 0.3 mm thick layers of 78 percent surface area ultrafine glass mats (having the above-described composition) was used in between the two layers of 225B. The overall thickness of the multilayered separator in each of these last groups of cells was the same as the controls as well as the second and third sets.

Figure 2:
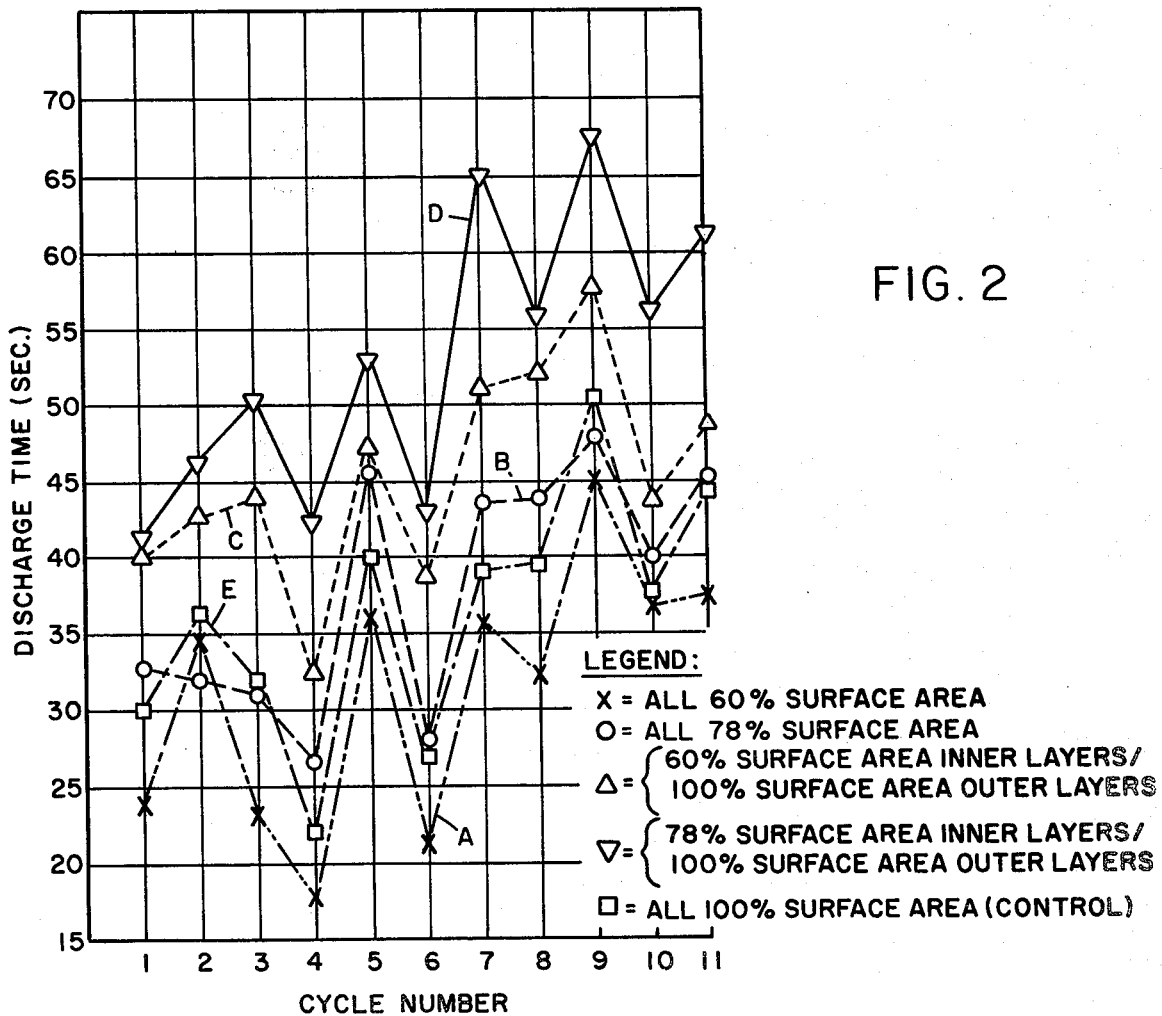
FIG. 2 plots the high rate low temperature discharge time versus cycle number for cells of the invention (Curves C and D), and makes comparisons with controls.

The comparative results plotted in FIG. 2 for each of the five cell groups represents the average discharge time respectively after each cycle of each set of rechargeable cells. Each of the cells of the five types were subjected to an identical high rate low temperature discharge cycle regime consisting of a discharge at the 10C rate (25 amperes) down to a 1.0 volt cutoff, followed by a constant current recharge at 150 milliamperes for 20 hours (cycles #1 through #6), and a constant voltage recharge at 2.55 volts per cell for sixteen hours (cycles #7 through #11). Discharging for each cycle was conducted at −20° C. The groups were charged in series at room temperature. The batteries were not tested at any different temperature. After each of the 6th, 7th and 8th cycles all of the cells were uniformly subjected to a conditioning cycle (not plotted) consisting of an additional discharge down to 0.1 volts at the C/2 rate (1.25 amperes) and then a recharge for 16 hours at 2.5 volts per cell. The test was terminated after the 11th cycle.

As can be seen from the results shown in FIG. 2, the cells with the Dexter 225B next to each plate with the 78 percent surface area glass fibers sandwiched therebetween (Curve D) yielded discharge times which averaged approximately 25 percent longer than the production controls on each cycle, represented by Curve E. The next best high rate low temperature discharge times were obtained with the Dexter 225B layers adjacent each plate with 60 percent surface area glass fiber mats sandwiched therebetween (Curve C) which gave approximately 12 percent better average discharge times than the controls. The cells having the multilayered dual surface area separators represented by Curves C and D also gave considerably better discharge times under the test as compared to the cells containing all 60 percent surface area ultrafine glass mats (Curve A) and the cells containing all 78 percent surface area glass mats (Curve B).

The significance of improved high rate low temperature discharge times is well appreciated by those skilled in the art. The high rate low temperature discharge test simulates battery output for engine starting and the like in cold weather, such as encountered when internal combustion or diesel engines are started with the aid of starting lighting and ignition (SLI) batteries in cold climates.

While certain representative embodiments and details have been shown for the purpose of illustrating the invention, it will be apparent to those skilled in this art that various changes and modifications may be made therein without departing from the spirit or scope of the invention.

What is claimed is:

1. A normally sealed maintenance-free lead-acid electrochemical cell having at least one porous positive plate, at least one porous negative plate, a gas permeable separator interposed between such plates, and sulfuric acid electrolyte absorbed in the pores of the plates and separator, said separator comprising:

a first outer porous layer formed of ultrafine fibers readily wetted by sulfuric acid electrolyte, having a fiber surface area in the range from about 0.1 to about 20 square meters per gram of such fiber material, and positioned against a given polarity electrode plate of the cell;

a second such outer porous layer formed of ultrafine fibers, positioned against the opposite polarity electrode plate of the cell; and a third porous layer interposed between the first and second layers, comprised of ultrafine fibers readily wetted by the sulfuric acid acid electrolyte, having a fiber surface area on an equivalent weight basis substantially less than that of at least one of said first and second layers.

2. The cell of claim 1 wherein the third layer has a determined area (expressed in square meters per gram of fiber material present in the third layer) of from about 30 to about 90 percent of the determined surface area of either of said first or second layers.

3. The cell of claim 1 wherein the bulk of the electrolyte is retained within the separator and a minor proportion of the electrolyte is contained within the positive and negative plates, in an amount such that the plates are under filled and have a void volume for gas transport, and the separator is also less than fully filled so as to be permeable to gas to enhance the rate of recombination of the gas internally within the cell.

4. The cell of claim 1 wherein the first and second porous layers are formed of ultrafine fiber glass compressible mats having an uncompressed porosity of from about 60 to about 95 percent, and the third porous layer is comprised of ultrafine fiber glass compressible mat also having an uncompressed porosity of from about 60 to about 95 percent and having, compared with both the first and second layers, a substantially reduced fiber surface area on an equivalent weight basis.

5. The cell of claim 4 wherein the third layer has a surface area, expressed in square meters per gram of silica, of from about 30 to about 90 percent of the surface area of the first and second layers.

6. The cell of claim 4 wherein the third layer has a surface area, expressed in square meters per gram of silica, of from about 50 to about 90 percent of the surface area of the first and second layers.

7. The cell of claim 4 wherein the third layer has a surface area, expressed in square meters per gram of silica, of from about 70 to about 85 percent of the surface area of the first and second layers.

8. In a maintenance-free normally sealed lead-acid cell having at least one porous positive plate, at least one porous negative plate, a highly electrolyte absorptive gas permeable ultrafine fiber glass mat separator interposed between such plates, and electrolyte in a starved amount absorbed in the pores of the plates and separator, the improvement comprising a multilayered substantially all fiber glass separator in which an interior layer of the separator comprised of ultrafine fiber glass, not in contact with either plate, has a fiber surface area which on an equivalent weight basis is substantially less than that of an outer separator layer in contact with one of the plates.

9. The cell of claim 8 wherein the interior layer has a surface area of from about 30 to about 90 percent of the surface area of an outer separator layer in contact with a plate.

10. The cell of claim 8 wherein the interior layer has a surface area of from about 50 to about 90 percent of the surface area of an outer separator layer in contact with a plate.

11. The cell of claim 8 wherein the layers of the multilayered separator are held together solely by mutual compression.

12. A maintenance-free normally sealed lead-acid cell having at least one porous positive plate, at least one porous negative plate, a gas permeable multilayered separator interposed between such plates, and sulfuric acid electrolyte absorbed in the pores of the plates and separator, the separator comprising, first and second porous layers comprised of ultrafine fiber glass compressible mats, the major portion of fibers on a weight basis having an average fiber diameter of less than about 3 microns, and having an uncompressed porosity of from about 60 to about 95 percent and positioned respectively against opposite polarity electrodes of the cell; and a third porous compressible layer comprised of ultrafine fiber glass, and also having an uncompressed porosity of from about 60 to about 95 percent, interposed between the first and second layers, and having, compared with the first and second layers, a substantially reduced fiber surface area on an equivalent weight basis.

13. The cell of claim 12 wherein said layers of the multilayered separator are held together solely by mutual compression.

14. The cell of claim 12 wherein the third layer has a surface area, expressed in square meters per gram of silica, of from about 30 to about 90 percent of the surface area of the first and second layers.

15. The cell of claim 13 wherein the electrolyte absorbed in the pores of the plates and separator is so distributed that the bulk of the electrolyte is retained within the separator and a minor proportion of the electrolyte is contained within the positive and negative plates, and the electrolyte is present in an amount such that the plates are under filled and have a void volume for gas transport, and the separator is also less than fully filled so as to be permeable to gas through open channels therein to enhance the rate of recombination of the gas internally within the cell.

16. The cell of claim 15 wherein each of the first, second and third layers have an uncompressed porosity of from about 70 to about 92 percent, and a surface area of from about 1 to about 15 square meters per gram of silica, wherein the third layer has a surface area of from about 50 to about 90 percent of the surface area of either of the first or second layers, and wherein the multilayered separator is held together by mutual compression in the cell.

* * * * *